Nov. 30, 1965     T. P. ANDERSON ETAL     3,220,133
FILM RECORD CARD
Filed Sept. 8, 1964
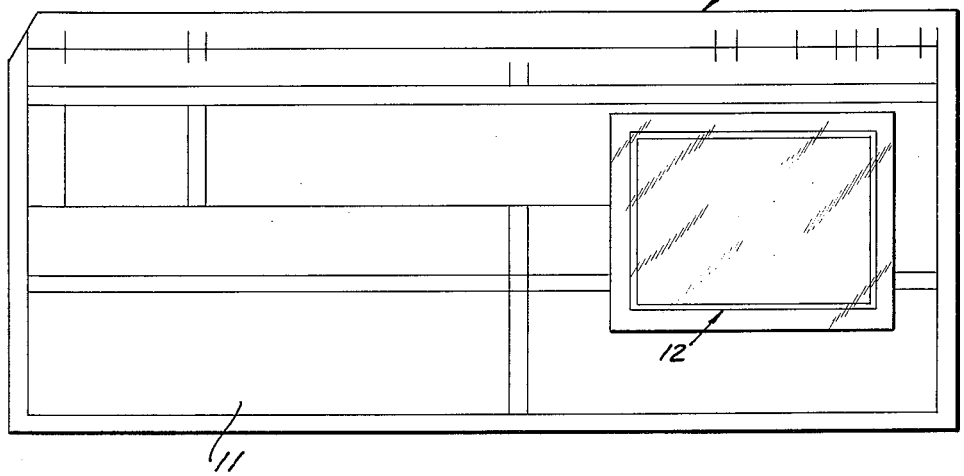
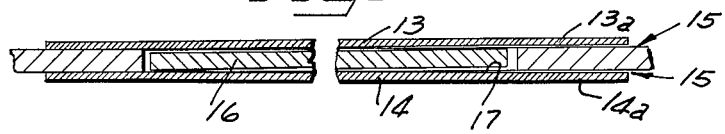
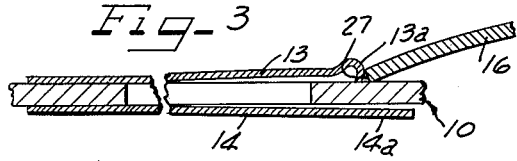
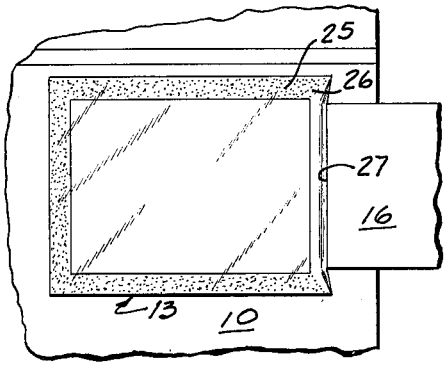
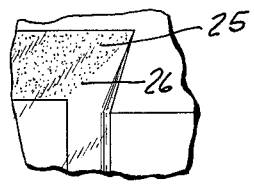
INVENTORS
THOMAS P. ANDERSON
ROBERT BEISPEL
BY     ATTORNEYS

United States Patent Office

3,220,133
Patented Nov. 30, 1965

3,220,133
FILM RECORD CARD
Thomas P. Anderson, Hubbard Woods, and Robert Beispel, Des Plaines, Ill., assignors to Microseal Corporation, Chicago, Ill., a corporation of Illinois
Filed Sept. 8, 1964, Ser. No. 394,767
7 Claims. (Cl. 40—159)

This invention is directed to film record cards and is more particularly directed to a film record card of the type wherein microfilm strips or the like may be mounted within or on a statistical card. This case constitutes a continuation-in-part of our earlier application for patent entitled "Film Record Card, Serial No. 170,744, now Pat. No. 3,147,561, which was filed on February 2, 1962.

With the ever increasing use of microfilm records and statistical cards in conjunction with one another, it has become desirable to provide a means for mounting a microfilm directly on such a statistical card. Many means have in the past been devised for mounting such microfilm records on statistical cards but such prior developments have not proven entirely satisfactory.

For instance, a good many structures have been devised wherein microfilm strips are simply mounted over apertures formed within cards by means of a suitable adhesive. Other structures have been devised wherein a transparent sheet overlies the aperture within a card and is secured to one surface of the card and thereafter a microfilm strip is mounted across the aperture on the rear face of the card or directly on the transparent sheet by means of adhesives so that the front surface of the film is protected. In each of the foregoing instances however, at least one surface of the film strip is exposed and is thus susceptible to dust damage and the adverse effects of handling. Still further, in each of the foregoing types of structures, the film strip is mounted in place by means of an adhesive so that for all practical purposes the film strips are permanently mounted on their respective statistical cards.

Still other fill display cards have been devised wherein film strips are adapted to be fitted within pockets formed on one surface of the statistical cards.

Still further, record cards have been devised having apertures therein which are adapted to receive separate film holder assemblies which themselves serve as a mounting means for a film strip and which are adapted to be inserted within the record card aperture and secured therein by a suitable means. In these structures, however, the film holder assembly must be removed before a film strip may be inserted or removed from the film holder assembly itself.

We have devised a film record card which is believed to obviate each of the above enumerated disadvantageous characteristics of prior types of film record cards but which is very simple in design and which is therefore economical to produce and use while facilitating utilization of the film strip.

In general, the invention finds its principal utility in connection wtih a record card having an aperture formed therein and having transparent enveloping members or sheets disposed on opposite sides of the card and overlying the aperture. The sheets, if rectangular in configuration, have three edges thereof secured to the opposed surfaces of the card by means of a suitable adhesive or the like which is placed on the card along the edges of the aperture but the fourth edges thereof are not sealed to the card although they do overlie the card (that is, that edge of each sheet does not terminate at the edge of the aperture). A microfilm strip may thus be inserted into the pocket formed intermediate the enveloping members, between one surface of the card and that portion of the transparent sheet mounted thereon which is not secured to the card surface. Inasmuch as the unsecured edge of the transparent sheet overlies the adjacent surface of the record card, very little dust will seep into the pocket formed intermediate the enveloping members and the film strip will thus practically be protected from all atmospheric impurities and will, of course, be protected from stains, etc. resulting from handling of the card. Nonetheless, since no adhesive is used on the film strip for maintaining it in its proper position within the record card aperture, the film strip may readily be removed from the card pocket.

It should be also understood that one of the transparent sheets may have its entire peripheral edge sealed to the surface of the card while the other sheet has only three edges thereof secured to the card. In some instances it may be desirable however to provide both enveloping members with an unsecured edge particularly where it is preferable to have a means for mounting a film strip on the card from either surface of the card for use in tabulating machines.

Generally speaking, it will be most desirable to provide an aperture in the record card which is only slightly larger than the film strip to be mounted therein so that the edges of the card defining the aperture will maintain the film strip in a fixed position.

It will be understood of course that the unsecured edges of the enveloping members lie in juxtaposition to the respective faces of the record card. It has been found that if the unsecured surface of an enveloping member is arcuately shaped or non-linear instead of being straight-edged, the enveloping members may be ripped or torn when one attempts to force a film strip into the film pocket. By providing the unsecured edge of an enveloping member with a straight edge such tearing can be effectively prevented since the straight edge of the film strip being inserted into the film pocket will evenly engage the unsecured straight edge of the enveloping member throughout the whole length of the film strip end so that the edge of the enveloping member will buckle under to permit the film strip to be inserted into the film pocket.

It should also be understood that film record cards of the type above described are generally employed in great quantities and are stacked or racked so that it is desirable to keep the extra thickness of the card created by the addition of the film pocket to a minimum. To this end it is of course desirable to prevent the mounted film strip from creeping up over the edge of the record card to the space between the record card and an enveloping member. In order to prevent such movement of the film strip, the adhesive coating which serves to mount the enveloping members on the card is most advantageously applied right up to the edge of the card defining the aperture.

As above noted, record cards constructed in accordance with this invention have the unsecured edges of the enveloping members extending beyond the end of the aperture and the adhesive coating must according extend beyond the aperture edge for the same distance in order to prevent the unsecured end of the enveloping member from flapping so as to prevent it from being torn or ripped off the card. This extended adhesive coating however has been found to present its own difficulties inasmuch as the ends of the unsecured edge of an enveloping member are not free to buckle under when a film strip is inserted into the film pocket with the result that film strip insertion is made quite difficult and/or the enveloping member becomes ripped by the leading edge of the film strip. In order to obviate these difficulties, we have applied the adhesive coating to the card so that the inner periphery thereof tapers outwardly from the corners of the aperture adjacent the unsecured edge of the enveloping member. By so tapering the adhesive coating, the unsecured edge of the enveloping member is maintained in its proper position in juxtaposition to the face of the record card but the portion of the unsecured edge of the enveloping member engaged by the leading edge of the film strip when that film strip is inserted in the film pocket is free to buckle under itself to permit such insertion.

It is therefore an object of our invention to provide an improved film record card having a means for mounting a film strip on a card in such a manner that the strip will be protected on each side thereof from atmospheric impurities and from stains, etc., resulting from handling of the card.

Another object of the invention is directed to the provision of a card of the type above described having the enveloping members secured to the surfaces of the card by an adhesive coating in a manner which will facilitate insertion of a film strip.

A more specific object of the invention resides in the provision of an aperture card having enveloping members secured thereto over the aperture by an adhesive coating which is applied so that the coating application tapers outwardly away from the corners of the aperture underlying the unsecured edge of an enveloping member whereby to facilitate insertion of a film strip within the pocket.

These and other objects of the invention will appear from time to time as the following specification proceeds and with reference to the accompanying drawings, wherein:

FIGURE 1 is a front elevational view of a film record card in which the instant invention may be embodied.

FIGURE 2 is a fragmental vertical sectional view of the card illustrated in FIGURE 1;

FIGURE 3 is a fragmentary vertical sectional view of the record card illustrated in FIGURE 1 illustrating the manner in which the leading edge of the film strip acts to buckle under the unsecured edge of an enveloping member;

FIGURE 4 is a fragmentary plan view illustrating the insertion of a film strip;

FIGURE 5 is an enlarged fragmentary plan view of the card illustrated in FIGURE 4 which more clearly shows the tapered inner periphery of the adhesive coating;

Referring initially to FIGURE 1, a film record card 10 is illustrated as comprising the usual statistical card 11 having a rectangular aperture 12 formed therein.

Transparent enveloping members or sheets 13 and 14 are rectangular in configuration and are mounted on the front and rear surfaces, respectively, of the card 11 so that they overlie the aperture 12. The rear sheet 14 may be secured to the rear wall of the card 11 around the aperture 12 about the entire periphery thereof by means of a suitable adhesive coating. However, in FIGURE 2 the enveloping members 13 and 14 are illustrated as being mounted over the aperture so that their edges overlie portions of the card defining the aperture but only three edges of each of the enveloping members are secured to the respective surfaces of the card. In each case an unsecured portion of the enveloping member (13a and 14a, respectively) overlies the card. Since the unsecured edge portions 13a and 14a are affixed to the record card only at their ends, a slight gap 15 may be formed between the enveloping members and the record card. In fact, this gap would be very small and may not exist at all. This of course would be dependent upon the manner in which the enveloping members were mounted on the record and on whether or not the record card is disposed in a completely flat plane. It is very important to understand that the unsecured edge or edges of one or both of the enveloping members lies parallel to the ends of the card so that when the record card is passed sideways through a film sorting machine the sensing fingers, rollers, and the like will not catch on any part of the enveloping member.

We have found that polyethylene terephthalate films such as "Mylar" (produced by Du Pont de Nemours & Co. of Wilmington, Delaware, U.S.A.) are ideally suited for use in forming the enveloping members. Such films may have a thickness as small as 0.00025 inch and can be satisfactorily employed with thicknesses up to 0.0005 inch.

Mylar is a rugged, clear film having about ⅓ the strength of machine steel and having a tensile strength of 17,000 to 20,000 p.s.i. which is about twice that of cellophane and five times that of polyethylene. One of its properties consists of the fact that it has excellent resistance to acids, greases, oils, and organic solvents. Still further, such a film can be produced in a transparent but colored form so that it can act as a filter in the manner above described.

Generally speaking, it will be understood that a film strip 16 may be inserted through the gap 15 into the film pocket 17 formed intermediate the enveloping members 13 and 14 and that once disposed within the pocket, as illustrated in FIGURE 2, it will be protected from substantially all atmospheric impurities as well as from stains caused by handling and the like. Since the enveloping members 13 and 14 are transparent, light may be transmitted through the enveloping members as well as the film 16 if it is desired to project the film image on a screen and thus removal of the film for this purpose is not necessitated. Still further, practically all foreign particles will be prevented from entering the pocket 17 since the edge portions of the enveloping members which are not secured to the card 11 substantially overlie the card and are normally maintained in juxtaposition with the respective surfaces of the card due to the fact that they are maintained relatively taut by the other secured edges thereof.

The film strip 16 is thus secured within the card 11 in such a manner that it may be readily viewed at will without necessitating its removal from the card while at the same time, it is protected from damage but is not itself physically altered since no adhesives are applied to the film strip. Furthermore, the film 16 is protected from being accidentally damaged since it is held in coplanar relation with the card 11 by the enveloping members 13 and 14. Viewing of the film strip by light projection through the film pocket is not hampered by an edge of one or more of the enveloping members overlying the surface of the film strip as is true in some prior devices of this type.

As heretofore noted, in order to prevent any possibility that the film strip within the film pocket might creep up onto the surface of the record card between the record card and the enveloping member, it is desirable to apply the adhesive coating up to or very close to the edges of the aperture.

It has also been observed that additional problems are posed by the application of an adhesive coating to the card in a manner such that the innermost edge of the coating extends in a straight line from each of the side edges of the aperture a sufficient distance past the end edge of the aperture to secure the end portions of the unsecured ends 13a and 14a to the card. In order to facilitate film strip insertion, we have applied to the adhesive coating 25 so that the inner periphery 26 thereof tapers outwardly from the corners of the aperture adjacent the unsecured end portions of the enveloping members. By applying the adhesive coating 25 in this manner, the unsecured edge portion 13a of the enveloping member 13 can be buckled or "humped" in the manner illustrated in FIGURE 5 along the entire leading edge 27 of the film strip 16. In the adhesive coating 25 were not tapered as at 26, such buckling or "humping" might not be effected at the outer ends of the leading edge of the film strip 16 with the result that the enveloping member 13 might be torn when one attempted to force the film strip into the film pocket.

It should be understood that under some circumstances it may be desirable to provide a film record card designed to carry a microfilm strip on one surface of the card and to protect that microfilm strip by a piece of microfilm overlying the said one surface of the card to maintain the microfilm in a fixed position on the card. This arrangement is a much lower cost version of the card heretofore described but may be practicable under some circumstances. At any rate, it is contemplated that for such an arrangement, a tabulating card will have an aperture formed therein which has a configuration similar to that of the microfilm strip to be mounted thereon but which has a smaller area than the strip so that the strip can lie on the card over the aperture with its periphery seated on that portion of the card defining the aperture. An enveloping member can be mounted on the card surface by an adhesive coating spaced away from the edges of the aperture. The spacing between the inner periphery of the adhesive coating and the edge of the aperture provides a shoulder which can serve as a seat for the peripheral edge of the microfilm strip. Only one enveloping member will be provided so that only one surface of the microfilm will be protected from atmospheric impurities and under these circumstances, it will be found most prudent to mount the microfilm intermediate the card surface and the enveloping member with the emulsion of the film facing the enveloping member to protect the emulsion surface. In this arrangement, that portion of the adhesive coatings extending beyond the end edge of the aperture and running along each side of the aperture is applied so that the coatings are there spaced apart a distance greater than the width of the aperture whereby to provide the desired mounting effects already described.

It will be understood that this embodiment of the invention has been used for illustrative purposes only and that various modifications may be made from our invention without departing from the spirit and scope of the novel concepts thereof.

What we claim is:

1. A film record card comprising:
   a card having a rectangular aperture formed therein and having side and end edges defining the perimeter of said aperture,
   an adhesive coating extending around two of said side and one of said end edges and extending along said side edges past said other end edge,
   wherein the inner periphery of the portions of said coating extending past said other end edge are tapered outwardly, and
   an enveloping member entirely covering said aperture and said coating and secured to said card by said adhesive coating.

2. A film record card comprising:
   a card having an aperture formed therein and having side and end edges defining the perimeter of said aperture,
   an adhesive coating applied to at least one surface of said card and extending around two of said side and one of said end edges and extending along said side edges past the other of said end edges,
   wherein the inner periphery of the portions of said coating extending past said other end edge are tapered outwardly,
   an enveloping member overlying said aperture and said coating and secured to said one surface of said card by said coating,
   a film strip having an image thereon, and
   means maintaining at least the portion of said film strip having said image hereon in juxtaposition to that portion of said enveloping member overlying said aperture.

3. A film record card comprising:
   a card having a rectangular aperture formed therein and having side and end edges defining the perimeter of said aperture,
   an adhesive coating lying on one surface of said card along two opposed side edges of said aperture and past one end edge thereof,
   wherein the inner preiphery of the portions of said coating extending past said end edge are tapered outwardly, and
   an enveloping member fitted over at least a portion of said aperture and said coating and secured to said card by said adhesive coating.

4. A film record card comprising:
   a card having a rectangular aperture formed therein and having side and end edges defining the perimeter of said aperture,
   an adhesive coating extending along one surface of said card adjacent to opposed side edges of said aperture and past one end edge of said aperture to define a mouth for receiving microfilm strips inserted within said aperture,
   wherein the inner edge portions of the adhesive coating defining said mouth and extending past said one end edge of said aperture are spaced apart a distance greater than the width of said aperture between said side edges, and an enveloping member entirely overlying said aperture and said coating and secured to said card by said adhesive coating, and
   another enveloping member entirely overlying said aperture on the opposite side of said card whereby to define a film pocket within the aperture intermediate the two enveloping members.

5. A film record card comprising:
   a card having a rectangular aperture formed therein and having side and end edges defining the perimeter of said aperture,
   an adehsive coating on one surface of said card extending along said side edges and past one of said end edges,
   wherein the inner periphery of the portions of said coating extending past said one end edge of said aperture taper outwardly from the adjajcent corners of said aperture,
   a transparent enveloping member entirely covering said aperture and said coating and secured to said card by said coating,
   wherein said adhesive coating underlies the corners of said enveloping member to hold the edges thereof flat against said film record card, and
   a transparent film overlying said aperture on the opposite side of said card to define, with said enveloping member, a pocket for receiving microfilm.

6. A film record card comprising:
   a card having a rectangular aperture formed therein and having side and end edges defining the perimeter of said aperture,
   adhesive means lying on one surface of said card along two opposed side edges of said aperture and past one end edge thereof,
   wherein the inner periphery of the portions of said adhesive means extending past said end edge are tapered outwardly, and
   an enveloping member fitted over at least a portion of said aperture and said adhesive means and secured to said card by said adhesive means.

7. A film record card comprising:
   a card having a rectangular aperture formed therein and having side and end edges defining the perimeter of said aperture,
   adhesive means lying along one surface of said card adjacent to the opposed side edges of said aperture and past one end edge of said aperture,
   whereby the adhesive means lying on said one surface of said card past said one end edge of said aperture defines a mouth for receiving microfilm strips inserted within said aperture, and wherein the inner margins of the adhesive means defining said mouth and lying on said one surface of said card past said one end edge of said aperture are spaced apart a distance greater than the spacing between the inner margins of the adhesive means lying along said one surface of said card adjacent to the opposed side edges of said aperture, an enveloping member entirely overlying said aperture and said adhesive means and secured to said card by said adhesive means, and another enveloping member covering said aperture and secured to the opposite surface of said card, whereby to define a film pocket within the aperture intermediate the two enveloping members.

References Cited by the Examiner

UNITED STATES PATENTS

| | | | |
|---|---|---|---|
| 1,397,096 | 11/1921 | Hammer | 40—159 X |
| 1,454,152 | 5/1923 | Buck | 40—159 |
| 2,843,955 | 7/1958 | Engelstein | 40—158 |
| 3,019,579 | 2/1962 | Heckman | 40—158 |

FOREIGN PATENTS 382,105    10/1932    Great Britain.

EUGENE R. CAPOZIO, *Primary Examiner.*

LAWRENCE CHARLES, *Examiner.*

W. J. CONTRERAS, *Assistant Examiner.*